US012503797B2

(12) United States Patent
Mehbubani et al.

(10) Patent No.: US 12,503,797 B2
(45) Date of Patent: Dec. 23, 2025

(54) CIRCUMFERENTIALLY CONTINUOUS, FIRE SUPPRESSING, DIELECTRIC SLEEVE

(71) Applicant: Systems Protection Group US LLC, Northville, MI (US)

(72) Inventors: Ritesh Mehbubani, Royersford, PA (US); Xiaodan Qiu, Phoenixville, PA (US); Scott Ian McFarland, Phoenixville, PA (US); Kamel Fennell, Plymouth Meeting, PA (US); Alexis Zambino, Phoenixville, PA (US)

(73) Assignee: Systems Protection Group US LLC, Northville, MI (US)

( * ) Notice: Subject to any disclaimer, the term of this patent is extended or adjusted under 35 U.S.C. 154(b) by 555 days.

(21) Appl. No.: 17/862,745

(22) Filed: Jul. 12, 2022

(65) Prior Publication Data

US 2023/0014166 A1 Jan. 19, 2023

Related U.S. Application Data

(60) Provisional application No. 63/284,011, filed on Nov. 30, 2021, provisional application No. 63/257,551, (Continued)

(51) Int. Cl.
*D04B 1/22* (2006.01)
*D03D 1/00* (2006.01)
(Continued)

(52) U.S. Cl.
CPC .......... *D04B 1/225* (2013.01); *D03D 1/0035* (2013.01); *D03D 15/247* (2021.01); (Continued)

(58) Field of Classification Search
None
See application file for complete search history.

(56) References Cited

U.S. PATENT DOCUMENTS

2004/0003630 A1 1/2004 Akers et al.
2017/0114939 A1 4/2017 Tough
2018/0223717 A1 8/2018 Galamba et al.

FOREIGN PATENT DOCUMENTS

JP 4428655 B2 3/2010
JP 2010523839 A 7/2010
(Continued)

OTHER PUBLICATIONS

International Search Report, mailed Nov. 2, 2022 (PCT/US2022/073680).

*Primary Examiner* — Arti Singh-Pandey
(74) *Attorney, Agent, or Firm* — John D. Wright; Dickinson Wright PLLC

(57) ABSTRACT

A sleeve for protecting an elongate member, including a bus-bar of a battery pack, and method of construction thereof are provided. The sleeve includes a knit wall having a circumferentially continuous outer surface extending along a longitudinal axis between opposite open ends. The knit wall is formed at least in part by multifilament flame-resistant yarn. The multifilament flame-resistant yarn is knit to form both the knit wall, and also first ribs extending lengthwise along the circumferentially continuous outer surface or second ribs extending annularly about said circumferentially continuous outer surface. An impervious, flame-resistant coating is bonded to an outer surface of the circumferentially continuous knit wall.

18 Claims, 9 Drawing Sheets

Related U.S. Application Data filed on Oct. 19, 2021, provisional application No. 63/221,476, filed on Jul. 13, 2021.

(51) Int. Cl.

| | |
|---|---|
| ***D03D 15/242*** | (2021.01) |
| ***D03D 15/267*** | (2021.01) |
| ***D03D 15/513*** | (2021.01) |
| ***D04B 1/14*** | (2006.01) |
| ***D04B 21/20*** | (2006.01) |
| ***D06N 3/00*** | (2006.01) |
| ***D06N 3/04*** | (2006.01) |
| ***D06N 3/12*** | (2006.01) |
| ***D06N 3/14*** | (2006.01) |
| ***H01M 50/521*** | (2021.01) |

(52) U.S. Cl.

CPC ......... *D03D 15/267* (2021.01); *D03D 15/513* (2021.01); *D04B 1/14* (2013.01); *D04B 21/205* (2013.01); *D06N 3/0006* (2013.01); *D06N 3/0009* (2013.01); *D06N 3/047* (2013.01); *D06N 3/128* (2013.01); *D06N 3/14* (2013.01); *H01M 50/521* (2021.01); *D10B 2101/02* (2013.01); *D10B 2101/06* (2013.01); *D10B 2401/04* (2013.01); *D10B 2505/12* (2013.01); *H01M 2220/20* (2013.01)

(56) References Cited

FOREIGN PATENT DOCUMENTS

| | | | |
|---|---|---|---|
| JP | 2019520686 | A | 7/2019 |
| JP | 2019527778 | A | 10/2019 |

CIRCUMFERENTIALLY CONTINUOUS, FIRE SUPPRESSING, DIELECTRIC SLEEVE

CROSS-REFERENCE TO RELATED APPLICATIONS

This application claims the benefit of U.S. Provisional Application Ser. No. 63/284,011, filed Nov. 30, 2021, and the benefit of U.S. Provisional Application Ser. No. 63/257,551, filed Oct. 19, 2021, and the benefit of U.S. Provisional Application Ser. No. 63/221,476, filed Jul. 13, 2021, which are all incorporated herein by reference in their entirety.

BACKGROUND OF THE INVENTION

1. Technical Field

This invention relates generally to knit sleeves for protecting an elongate member contained therein, and more particularly to circumferentially continuous, axially and radially stretchable, fire suppressing dielectric knit sleeves.

2. Related Art

It is known to contain elongate members, such as wires, wire harnesses, cables and conduits of various types in circumferentially continuous, tubular walled sleeves to provide protection to the elongate members against impact and abrasion, fluid and external thermal affects. However, there remains a need for protective sleeving that can provide dielectric, fire suppressant protection to an elongate member contained therein, while also be able to attain a low profile, having a conformed fit about the elongate member and connectors thereof so as to not be cumbersome, unsightly and bulky, while also being impervious to dust, particles and smoke and being flexible so as to be able to be routed along a serpentine path, such as along bends of the elongate member, without becoming wrinkled. There is a further need to have a protective sleeve that is able to protect a bus-bar connection between cells of a battery of an electric vehicle battery system to enable the vehicle to remain drivable under power from the battery system for at least 5 minutes after a thermal runaway condition of one or more of the cells of the battery to enable a driver of the electric vehicle ample time to safely maneuver to a suitable parking location and vacate the vehicle.

SUMMARY OF THE INVENTION

One object of the disclosure is to provide a textile sleeve that provides dielectric, fire suppressant protection to an elongate member contained therein.

Another object of the disclosure is to provide a stretchable knit sleeve that provides dielectric, fire suppressant protection to an elongate member contained therein.

Another object of the disclosure is to provide protection to a bus-bar connection between portions of an electric vehicle battery pack via a textile sleeve to enable the battery pack to supply power to the electric vehicle for 5 minutes or more upon experiencing a problem within one or more cells of the battery pack.

Another object of the disclosure is to provide protection to a bus-bar connection between cells of a battery pack of an electric vehicle battery system to enable a driver of the electric vehicle ample time to safely maneuver to a suitable parking location and vacate the vehicle upon an elevated thermal condition resulting within one or more cells of the battery pack.

Another object of the disclosure is to provide protection to a bus-bar connection between cells of a battery pack of an electric vehicle battery system via a knit sleeve to enable the battery system to supply power to the electric vehicle for 5 minutes or more in the event an abnormal, elevated thermal condition results within one or more of the cells of the battery pack.

Another object of the disclosure is to provide a textile sleeve that is able to bend along a bus-bar between batteries and/or cells of an electric vehicle battery system and fit about any connector attached to the bus-bar.

Another object of the disclosure is to provide a knit sleeve that is able to conform about a bus-bar connection between cells of a battery pack of an electric vehicle battery system in snug fitting relation about the bus-bar and about any connector attached to the bus-bar.

In accordance these and other objects, a sleeve for providing protection to a bus-bar interconnecting cells of a battery pack of an electric vehicle is provided. The sleeve has a knit wall having a circumferentially continuous outer surface extending along a longitudinal axis between opposite open ends. The knit wall is formed at least in part by multifilament flame-resistant yarn. The knit structure of the knit wall is stretchable axially and radially, thereby allowing the knit wall easily to flex and be easily assembled into close conforming, wrinkle-free relation about the bus-bar regardless of the number of bends and shape of the outer contour of an outer surface of the bus-bar.

In accordance with another aspect of the invention, an impervious coating is provided to extend about the outer surface of the knit wall to prevent the ingress and penetration of dust, particles, smoke through the knit wall, and to enhance the flame resistance and resistance to flame protection of the sleeve.

In accordance with another aspect of the invention, the impervious coating is stretchable to allow the underlying knit wall to remain stretchable, thereby facilitating the formation of a wrinkle-free, snug conforming fit of the knit wall about the bus-bar.

In accordance with another aspect of the invention, the impervious coating is one of a silicone, silicone-based, liquid silicone rubber, polytetrafluoroethylene, or polyurethane layer bonded directly to the outer surface of the knit wall.

In accordance with another aspect of the invention, the multifilament flame-resistant yarn extends in a lengthwise direction generally or substantially (meaning it may not be perfectly parallel, but closely resembles a parallel relation to the naked eye of an observer, thereby being without about 5 degrees from true parallel) parallel to the longitudinal axis and in a circumferential weft direction about the longitudinal axis.

In accordance with another aspect of the invention, the flame-resistant yarn is a mineral yarn.

In accordance with another aspect of the invention, the mineral yarn can be provided as at least one of fiberglass, silica, and basalt.

In accordance with another aspect of the invention, the entirely of the knit wall can be knit from flame-resistant yarn.

In accordance with another aspect of the invention, the knit wall can be knit with a rib-knit pattern, having raised ribs extending in one of a lengthwise warp direction or a circumferential weft (fill) direction, thereby forming one of straight ribs extending in substantially parallel relation with the longitudinal axis, or annular ribs extending circumferentially about the longitudinal axis, with the ribs enhancing flexibility, conformability and stretchability.

In accordance with another aspect of the invention, the rib-knit pattern can be formed by alternating knit and purl stitches in a 1×1 and/or 2×2 knit stitch pattern.

In accordance with another aspect of the invention, the rib-knit pattern can include slip stitches to increase the height of the ribs(s).

In accordance with another aspect of the invention, a sleeve for protecting a bus-bar connection between portions of a battery pack system of an electric vehicle is provided. The sleeve consists of: a knit wall having a circumferentially continuous outer surface extending along a longitudinal axis between opposite open ends and outermost impervious coating bonded to an outer surface of the knit wall. The knit wall is formed of flame-resistant multifilament yarn. The outermost impervious coating is elastic, thereby allowing the underlying knit wall to remain stretchable, thereby facilitating the formation of a wrinkle-free, snugly conforming fit of the knit wall about the bus-bar.

In accordance with another aspect of the invention, a method of constructing a sleeve for providing dielectric protection to a bus-bar interconnecting portions of an electric vehicle battery pack to one another is provided. The method includes knitting multifilament flame-resistant yarn to form a knit wall having a circumferentially continuous outer surface extending along a longitudinal axis between opposite open ends. Further, forming a plurality of first ribs extending lengthwise in generally parallel relation with the longitudinal axis in the knit wall, or forming a plurality of second ribs extending circumferentially about the longitudinal axis in the knit wall.

In accordance with another aspect of the invention, the method can further include bonding an impervious coating to the outer surface of the knit wall.

In accordance with another aspect of the invention, the method can further include bonding an impervious coating having a uniform thickness over the entirety of the knit wall.

In accordance with another aspect of the invention, the method can further include forming the impervious coating from one of a silicone, silicone-based, liquid silicone rubber, polytetrafluoroethylene, or polyurethane layer.

In accordance with another aspect of the invention, the method can further include providing the multifilament flame-resistant yarn from at least one of fiberglass, silica, and basalt.

In accordance with another aspect of the invention, the method can further include forming the first ribs and the second ribs by alternating knit and purl stitches with one another.

In accordance with another aspect of the invention, the method can further include knitting the first ribs in substantially equidistantly spaced relation from one another or knitting the second ribs in substantially equidistantly spaced relation from one another.

In accordance with another aspect of the invention, the method can further include knitting the entirety of the knit wall from the mineral yarn.

In accordance with another aspect of the invention, a sleeve for providing protection to a bus-bar interconnecting portions, such as adjacent cells and/or adjacent battery modules, of an electric vehicle battery pack is provided. The sleeve has a textile wall having a circumferentially continuous outer surface extending along a longitudinal axis between opposite open ends. The textile wall is formed at least in part by multifilament flame-resistant yarn interlaced with shrinkable yarn. The shrinkable yarn is configured to constrict the continuous outer surface from a first diameter to a reduced second diameter, thereby bringing the textile wall into close fitting relation with the bus-bar.

In accordance with another aspect of the invention, an outer surface of the textile wall takes on a convolute contour to enhance flexibility of the textile wall to enable the textile wall to flex freely along bends of the bus-bar without kinking and to fit about connectors of the bus-bar.

In accordance with another aspect of the invention, an impervious coating can be provided to extend about the outer surface of the textile wall.

In accordance with another aspect of the invention, the impervious coating is one of a silicone, silicone-based, liquid silicone rubber, polytetrafluoroethylene, or polyurethane layer bonded directly to the outer surface of the textile wall.

In accordance with another aspect of the invention, the textile wall can be woven.

In accordance with another aspect of the invention, the multifilament flame-resistant yarn extends in a lengthwise direction generally parallel to the longitudinal axis of the textile wall and in a circumferential weft direction about the longitudinal axis and the shrinkable yarn extends only in a circumferential direction about the longitudinal axis.

In accordance with another aspect of the invention, the textile wall can be knitted.

In accordance with another aspect of the invention, the textile wall is braided.

In accordance with another aspect of the invention, the shrinkable yarn is heat-shrinkable.

In accordance with another aspect of the invention, a sleeve for protecting a bus-bar connection between cells and/or between battery modules of a battery pack of an electric vehicle is provided. The sleeve consists of: a tubular textile wall having a circumferentially continuous outer surface extending along a longitudinal axis between opposite open ends. The textile wall is formed of flame-resistant multifilament yarn interlaced with shrinkable yarn, wherein the shrinkable yarn is configured to constrict the continuous outer surface from a first diameter to a reduced second diameter.

In accordance with another aspect of the invention, the shrinkable yarn is configured to constrict the continuous outer surface to form the tubular textile wall having a convolute contour formed by alternating circumferentially extending peaks and valleys along its length.

In accordance with another aspect of the invention, a method of constructing a sleeve for providing dielectric protection to a bus-bar interconnecting portions, such as adjacent cells and/or adjacent battery modules, of an electric vehicle battery pack is provided. The method includes interlacing multifilament flame-resistant yarn to form a textile wall having a circumferentially continuous outer surface extending along a longitudinal axis between opposite open ends and, interlacing shrinkable yarn with the multifilament flame-resistant yarn, wherein the shrinkable yarn is configured to constrict the continuous outer surface from a first diameter to a reduced second diameter in to close fitting relation with the bus-bar.

In accordance with another aspect of the invention, the method can including configuring the shrinkable yarn to constrict the continuous outer surface to form the continuous outer surface having a convolute contour formed by alternating circumferentially extending peaks and valleys along its length.

In accordance with another aspect of the invention, the method can further include bonding a flexible, high temperature resistant, impervious coating to the outer surface of the textile wall.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

DETAILED DESCRIPTION OF PREFERRED EMBODIMENTS

Figure 1:
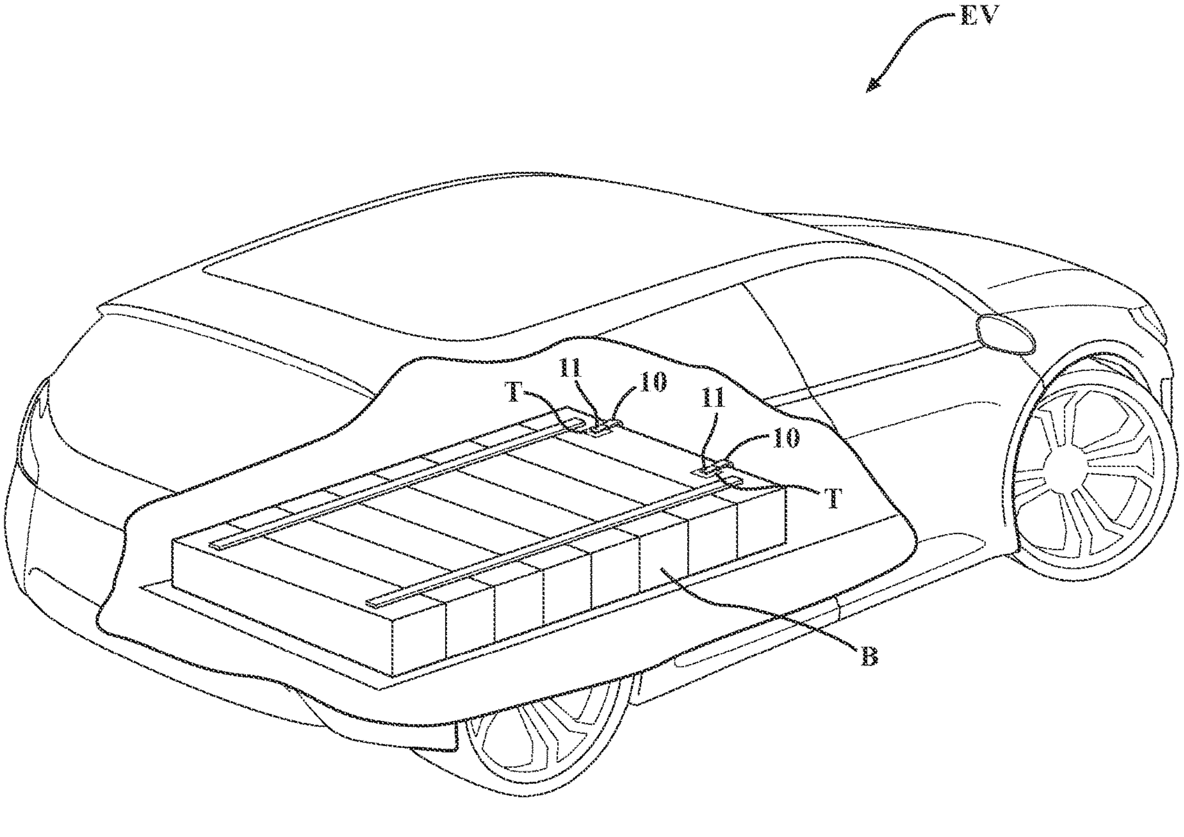
FIG. 1 is a perspective view of a motor vehicle having a knit sleeve constructed in accordance with one aspect of the disclosure shown disposed about an electric vehicle battery member to be protected.
Figure 2:
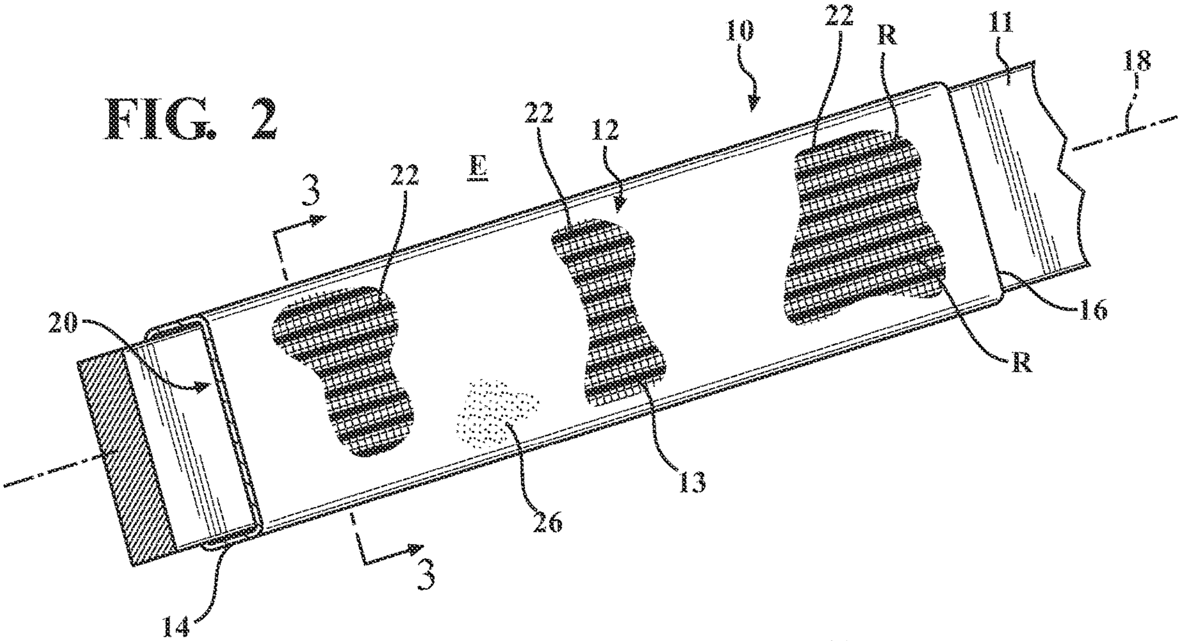
FIG. 2 is an enlarged, fragmentary schematic perspective view of the knit sleeve in accordance with one aspect of the disclosure shown disposed about the elongate member to be protected with the textile sleeve.
Figure 2A:
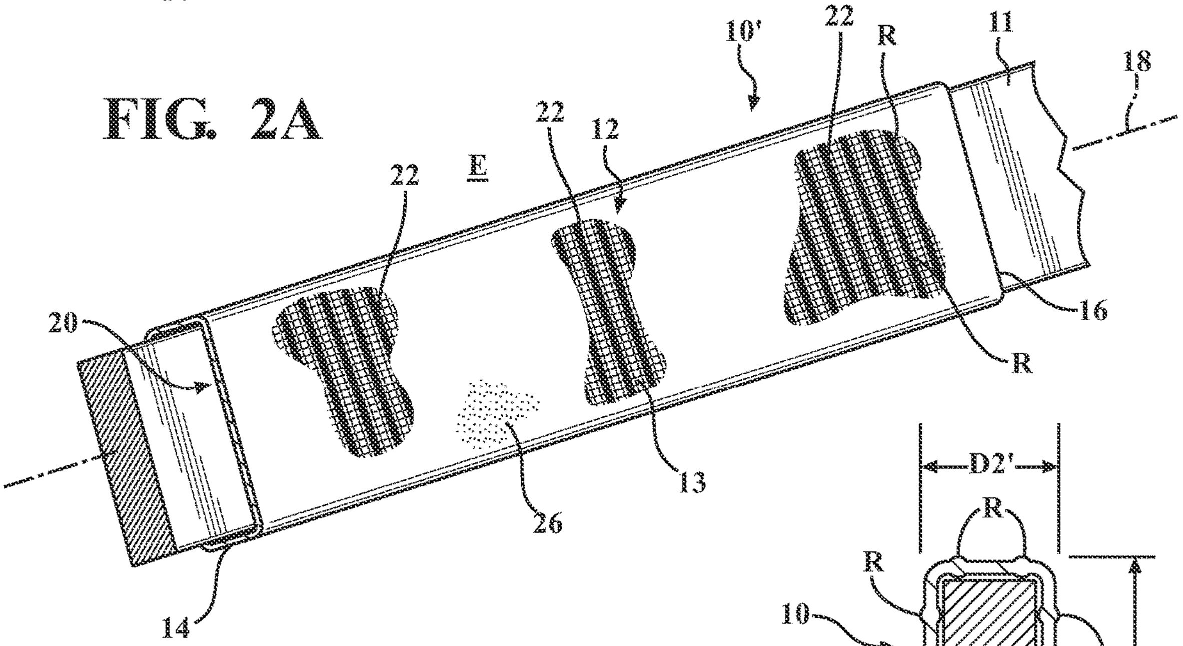
FIG. 2A is an enlarged, fragmentary schematic perspective view of the knit sleeve in accordance with another aspect of the disclosure shown disposed about the elongate member to be protected with the textile sleeve.
Figure 3:
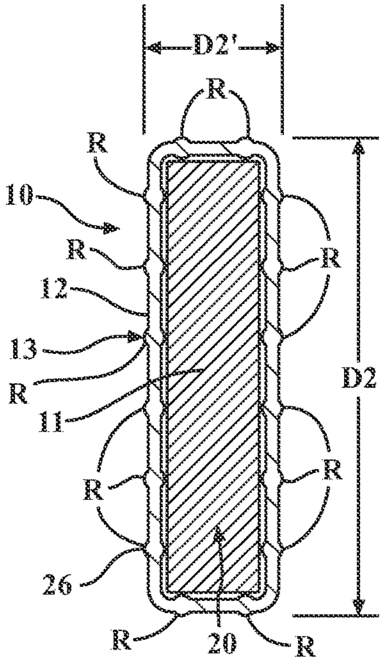
FIG. 3 is an enlarged schematic cross-sectional view taken generally along the line 3-3 of FIG. 2.
Figure 4A:
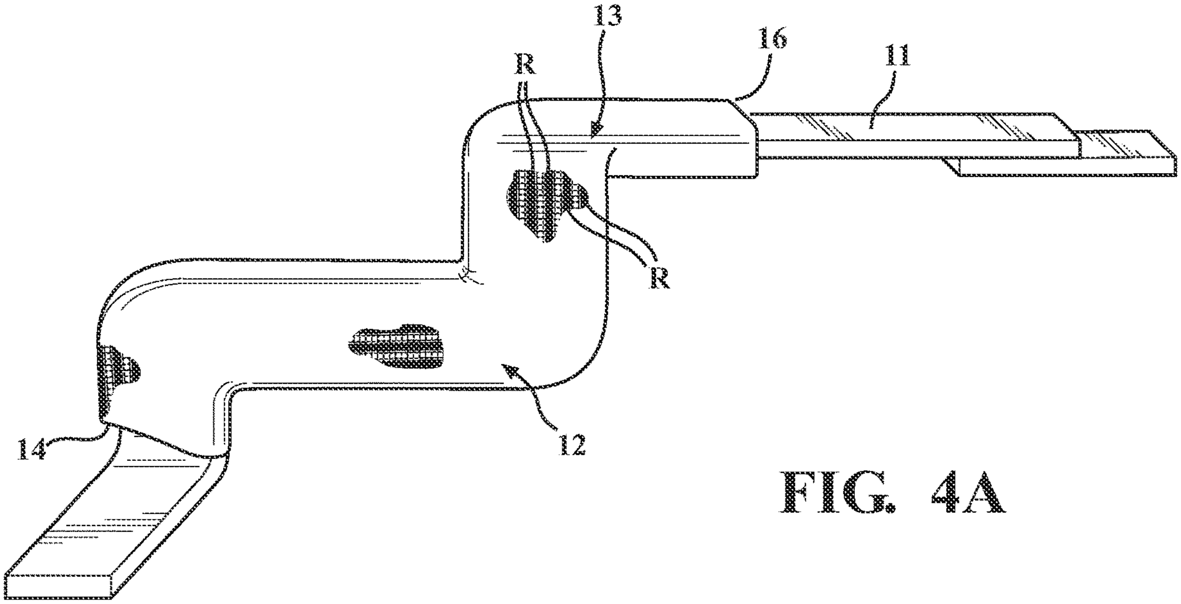
FIG. 4A is a view perspective view of the knit sleeve prior to being coated, with the knit sleeve shown disposed about the bus-bar.
Figure 4B:
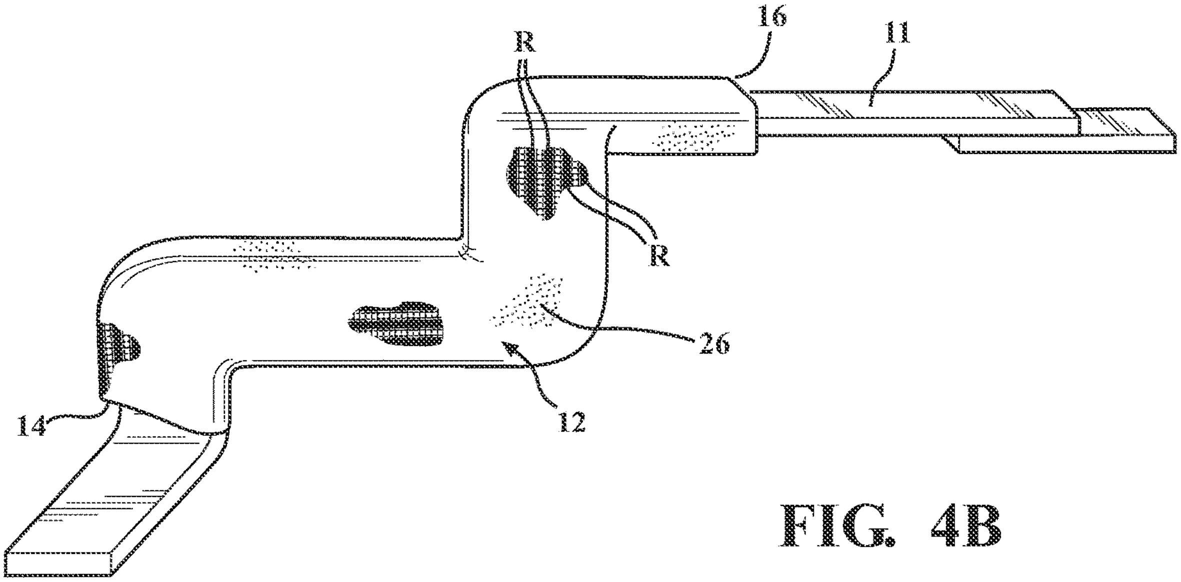
FIG. 4B is a view similar to FIG. 4A illustrating an impervious coating coated on an outer surface of the knit wall of FIG. 4A.
Figure 6:
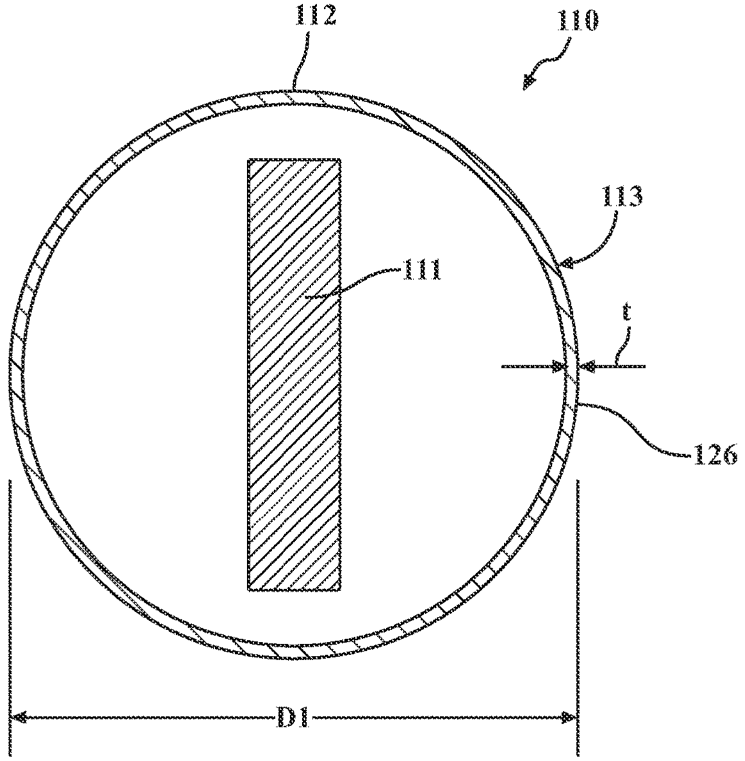
FIG. 6 is an enlarged schematic cross-sectional view taken generally along the line 6-6 of FIG. 5.

Referring in more detail to the drawings, FIG. 1 illustrates a protective textile sleeve, referred to hereafter as sleeve 10, constructed in accordance with one aspect of the invention having a textile knit wall 12 disposed about an elongate member 11 to be protected, such as a bus-bar interconnecting portions, such as adjacent cells and/or cell modules of a battery pack, referred to hereafter as battery B, of a vehicle, such as an electric vehicle EV, to one another. The knit wall 12 has a seamless, circumferentially continuous outer surface 13 that extends lengthwise between open opposite ends 14, 16 and about a longitudinal central axis 18 to bound a central cavity 20. The elongate member 11 extends through and is protected in the central cavity 20 against impact forces by the knit wall 12, such as may be experienced in a vehicle crash, abrasion, and ingress of contamination, by way of example and without limitation. The knit wall 12 suppresses flame propagation, such as in the event of thermal runaway of one or more of the cells of the battery B, thereby allowing the electric vehicle EV to remain powered by the battery for 5 minutes or more to allow the electric vehicle EV to be safely driven to a parked location, whereat the operator can evacuate the electric vehicle EV. The knit wall 12 is formed at least in part or entirely of flame-resistant multifilament yarn 22 knit in a rib-stitch pattern to enhance elasticity and stretchability of the wall 12 to facilitate assembly of the sleeve 10 about the elongate member 11. A plurality of ribs (R) are formed via alternating knit and purl stitches with one another in a desired pattern, such as 1×1; 2×2, by way of example and without limitation, to form lengthwise extending (warp direction) first ribs R (FIG. 2) or circumferentially extending (weft or fill) second ribs R (FIG. 2A) to facilitating the formation of a wrinkle-free, snug conforming fit of the knit wall 12 about the bus-bar 11, thereby facilitating assembly and the suppression of flame, having a non-bulky low profile, and being aesthetically appealing. Accordingly, the knit structure of the knit wall 12 is stretchable axially and radially (circumferentially), thereby allowing the knit wall 12 to flex and be easily assembled into close, snug fitting relation about the bus-bar 11.

To further enhance the flame resistance, stretchability and resilience of the sleeve 10, an impervious coating 26 is provided to extend about the outer surface 13 of the knit wall 12 to prevent the ingress and penetration of dust, particles, smoke through the knit wall 12, and to enhance the flame resistance and flame protection of the sleeve 10. The impervious coating 26 is elastically stretchable in all directions, including the lengthwise and radial directions, to allow the underlying knit wall 12 to remain stretchable along the lengthwise and radial directions, and is elastically resilient, thereby facilitating the formation of a wrinkle-free, snug conforming fit of the knit wall 12, and ultimately the sleeve 10, about the bus-bar 11.

Upon being exposed to an extreme heat scenario, such as during an unintended thermal runaway condition within the battery, the flame-resistant multifilament yarn 22 retain their structural integrity to suppress flame growth and propagation for at least 5 minutes or more, thereby allowing ample time for an occupant of the motor vehicle EV to park and/or evacuate the motor vehicle EV.

The impervious coating 26, such as a silicone, silicone-based, liquid silicone rubber, polytetrafluoroethylene, or polyurethane coating, can be applied and bonded to the outer surface 13, with the coating 28 also referred to as layer, being bonded directly to the outer surface 13. The impervious layer 26 can be applied to the outer surface 13 using any desired process that allows the desired thickness (t) of the layer 26 to be attained. In the exemplary embodiment, the thickness t is between about 0.05 and 3 mm, and more preferably between about 0.1 and 0.3 mm. When the layer 26 is provided within the aforementioned range of thickness t, flexibility and conformability of the wall 12 is optimized, and optimal dielectric strength is provided, which can provide a dielectric breakdown voltage between about 5 to 40 kV. Accordingly, the elongate member 11 is protected against unwanted electrical interference, including electromagnetic interference (EMI), radiofrequency interference (RFI), and electrostatic discharge (ESD). In addition to the various electrical protections, greatly enhanced protection to the elongate member 11 against impact forces can be provided by the layer 26. Further yet, enhanced protection against the ingress of contamination is provided, such as to fluid gas and solid debris, given the layer 26 can be hydrophobic and impervious to fluid and debris.

In accordance with another aspect, a method of constructing a thermally protective sleeve 10 is provided. The method includes knitting multifilament flame-resistant yarn to form a textile wall 12 having a circumferentially continuous outer surface 13 extending along a longitudinal axis 18 between opposite open ends 14, 16. The method can further includes knitting the multifilament flame-resistant yarn using a rib-stitch pattern to form first ribs R extending lengthwise along a longitudinal axis 18 of the sleeve 10 (FIG. 2), or second ribs R extending circumferentially in annular fashion about the longitudinal axis 18 of the sleeve 10 (FIG. 2A), wherein the ribs R enhance the flame resistance of the wall 12, while at the same time enhancing the stretchability of the wall 12 in both the radial and axial directions.

In accordance with another aspect of the invention, the method can further include bonding an impervious coating 26 to the outer surface 13 of the textile wall 12, wherein the impervious coating 26 is formed of an elastomeric material to enhance the stretchability and resilience of the sleeve 10.

In accordance with another aspect of the invention, the method can further include forming the impervious coating 26 with an elastomeric, stretchable silicone, silicone-based, liquid silicone rubber, polytetrafluoroethylene, or polyurethane material.

FIGS. 5-7B illustrate a textile sleeve, referred to hereafter as sleeve 110, constructed in accordance with one aspect of the invention having a textile wall 112 disposed about an elongate member 111 to be protected, such as a bus-bar interconnecting batteries B of a vehicle, such as an electric vehicle EV, to one another. The textile wall 112 has a seamless, circumferentially continuous outer surface 113 that extends lengthwise between open opposite ends 114, 116 and about a longitudinal central axis 118 to bound a central cavity 120, through which the elongate member 111 extends and in which the elongate member 111 is protected against impact forces, such as may be experienced in a vehicle crash, abrasion, and ingress of contamination, by way of example and without limitation. The wall 112 suppresses flame propagation, such as in the event of thermal runaway of one or more of the batteries, thereby allowing the electric vehicle to remain powered by the batteries B for 5 minutes or more to allow the electric vehicle to be safely driven to a parking location, whereat the operator can evacuate the electric vehicle. The textile wall 112 is formed of flame-resistant multifilament yarn 122 interlaced with shrinkable yarn 124, wherein the shrinkable yarn 124 is configured to constrict the continuous outer surface 113 from a first diameter D1 (FIG. 6) to a reduced second diameter D2 (FIG. 6A) into close fitting, conforming relation about the contour of the elongate member 111, thereby facilitating the suppression of flame, having a non-bulky low profile, and being aesthetically appealing. It is to be understood that the constriction of the sleeve 110 from the first diameter D1 to the second D2 may cause the sleeve 111 to take on a shape other than being circular, and may constrict about any underlying contour shape, such as rectangular (FIG. 6A), by way of example and without limitation, to conform into a close, snug fit about the generally rectangular cross-sectional shape of a known bus-bar 111. As such, the shrinkage of the sleeve 110 can conform to non-circular contours, such shown by constricting across a major diameter D2 and a minor diameter D2' of the bus-bar 111 illustrated in FIGS. 6 and 6A. This is especially useful when constricting about electrical connectors and the like, such as about terminals T of the vehicle battery B, by way of example and without limitation.

Figure 5:
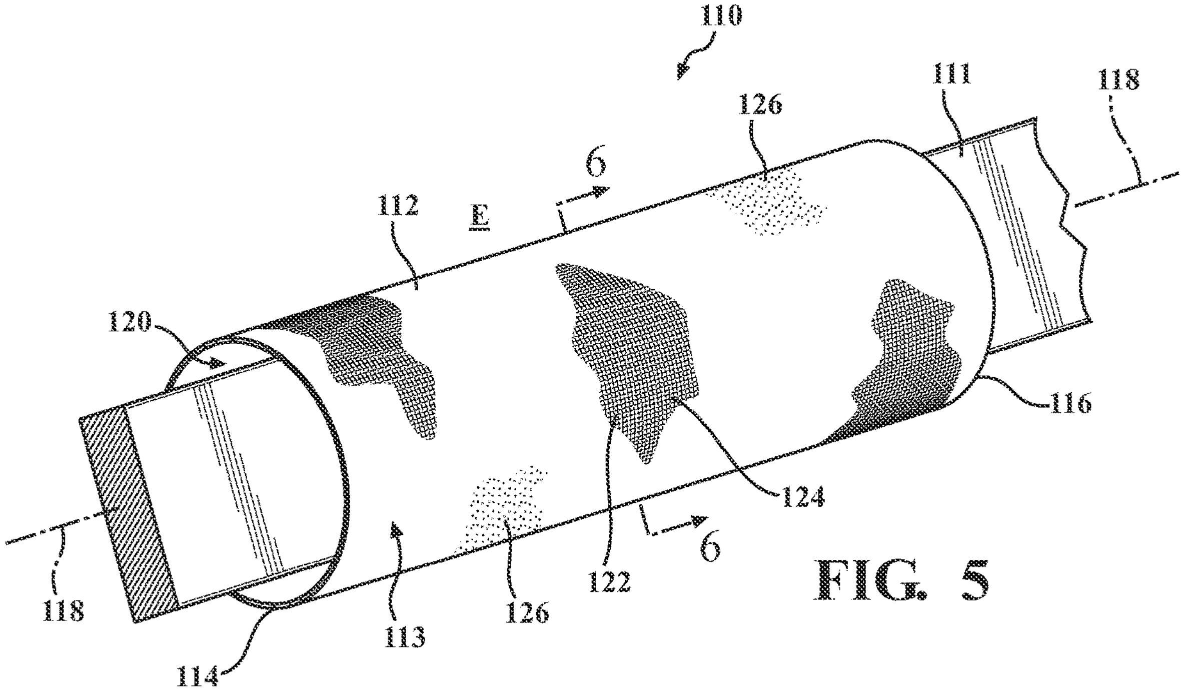
FIG. 5 is an enlarged, fragmentary schematic perspective view of a textile sleeve constructed in accordance with another aspect of the disclosure shown disposed about the elongate member to be protected with the textile sleeve shown in an as manufactured, non-shrunken state.
Figure 5A:
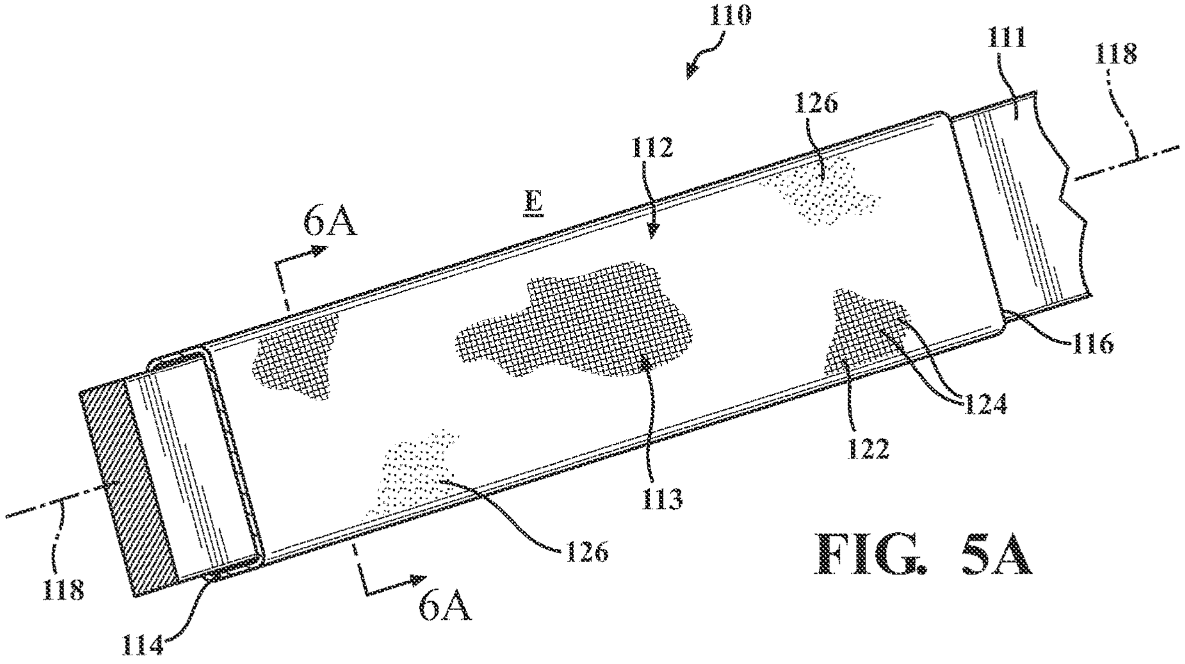
FIG. 5A is a view similar to FIG. 5 with the textile sleeve shown in a shrunken state.
Figure 6A:
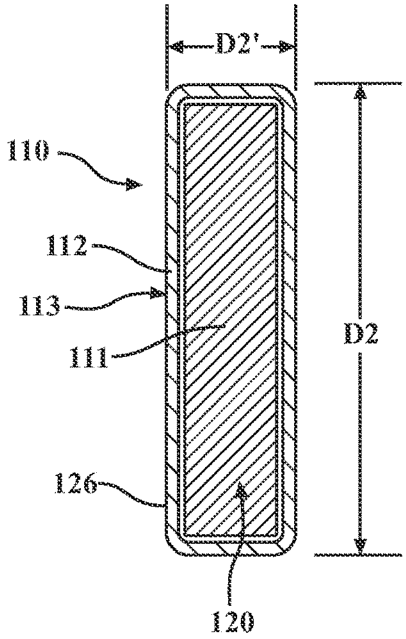
FIG. 6A is an enlarged schematic cross-sectional view taken generally along the line 6A-6A of FIG. 5A.
Figure 7A:
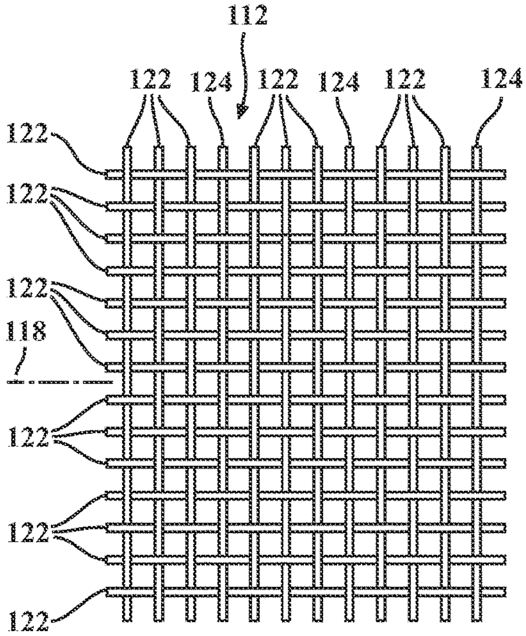
FIG. 7A is a schematic plan view of a textile layer of the sleeve illustrating the innermost textile layer being woven in accordance with one embodiment of the disclosure.
Figure 7B:
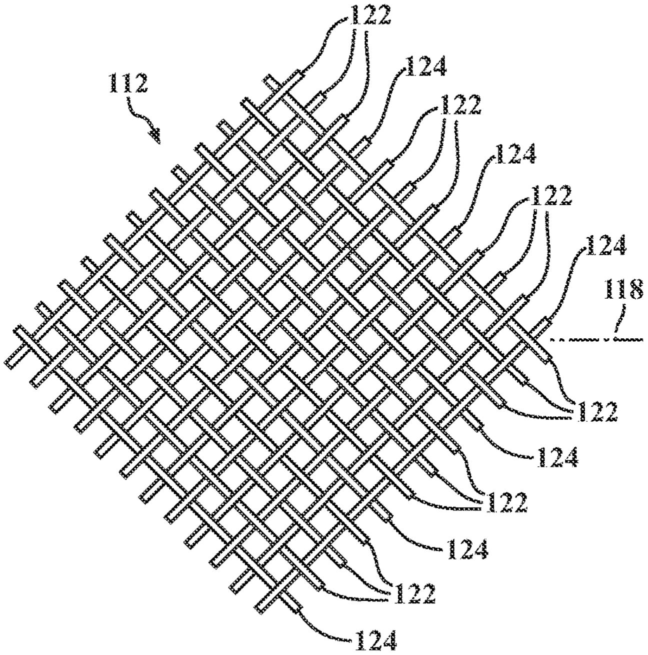
FIG. 7B is a view similar to FIG. 7A illustrating a textile layer being braided in accordance with another embodiment of the disclosure.
Figure 7C:
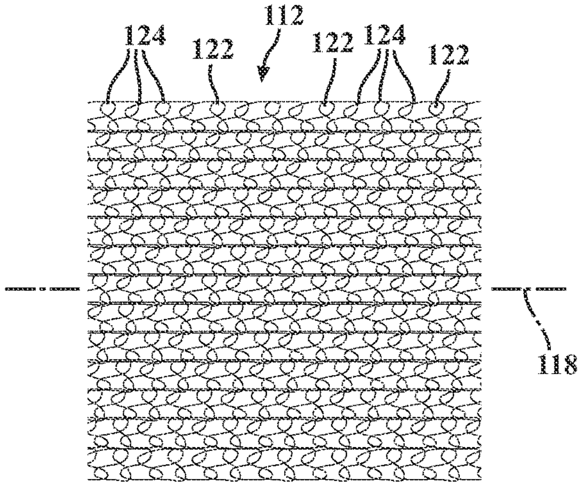
FIG. 7C is a view similar to FIG. 7A illustrating a textile layer being knitted in accordance with yet another embodiment of the disclosure.

The textile wall 112 is one of a woven wall (FIG. 7A), braided wall (FIG. 7B) or knit wall (FIG. 7C) constructed in circumferentially continuous, tubular fashion. It will be appreciated by one possessing ordinary skill in the art that a minimum amount of shrinkable yarn 124 can be used that is sufficient to bring the wall 112 from its enlarged assembly state (FIGS. 5 and 6) to its final assembled shrunken state (FIGS. 5A and 6A). Upon being exposed to an extreme heat scenario, such as during an unintended thermal runaway condition of one or more of the cells of the battery(ies) B, the shrinkable yarn 124 can be burned away or significantly burned by the excessive heat, while the flame-resistant multifilament yarn 122 retain their structural integrity to suppress flame growth and propagation for at least 5 minutes or more, thereby allowing ample time for an occupant of the motor vehicle EV to park and/or evacuate the motor vehicle EV.

An impervious coating 126 can be applied and bonded to the outer surface 113, such as a silicone, silicone-based, liquid silicone rubber, polytetrafluoroethylene, or polyurethane coating, also referred to as layer, bonded directly to the outer surface 113. The impervious layer 126 can be applied to the outer surface 113 using any desired process that allows the preferred thickness (t) of the layer 126 to be attained. In the exemplary embodiment, the thickness t is between about 0.05 and 3 mm, and more preferably between about 0.1 and 0.3 mm. When the layer 126 is provided within the aforementioned range of thickness t, flexibility and conformability of the wall 112 remains and optimal dielectric strength is provided, which can provide a dielectric breakdown voltage between about 5 to 40 kV. Accordingly, the elongate member 111 is protected against unwanted electrical interference, including electromagnetic interference (EMI), radiofrequency interference (RFI), and electrostatic discharge (ESD). In addition to the various electrical protections, greatly enhanced protection to the elongate member 111 against impact forces can be provided by the layer 126. Further yet, enhanced protection against the ingress of contamination is provided, such as fluid and debris, given the layer 126 can be hydrophobic and impervious to fluid and debris.

In accordance with another aspect, a method of constructing a sleeve 110 is provided. The method includes interlacing multifilament flame-resistant yarn to form a textile wall 112 having a circumferentially continuous outer surface 113 extending along a longitudinal axis 118 between opposite open ends 114, 116 and, interlacing the multifilament flame-resistant yarn 122 with shrinkable yarn 124, wherein the shrinkable yarn 124 is configured to constrict the circumferentially continuous outer surface 113 from a first diameter D1 to a reduced second diameter D2, D2' (including non-circular shapes, as discussed above) into close fitting, conforming relation with the bus-bar 111.

In accordance with another aspect of the invention, the method can further include bonding an impervious coating 126 to the outer surface 113 of the textile wall 112.

In accordance with another aspect of the invention, the method can further include weaving the multifilament flame-resistant yarn 122 and the shrinkable yarn 124 to form the textile wall.

In accordance with another aspect of the invention, the method can further include braiding the multifilament flame-resistant yarn 122 and the shrinkable yarn 124 to form the textile wall 112.

In accordance with another aspect of the invention, the method can further include knitting the multifilament flame-resistant yarn 122 and the shrinkable yarn 124 to form the textile wall 112.

Figure 8:
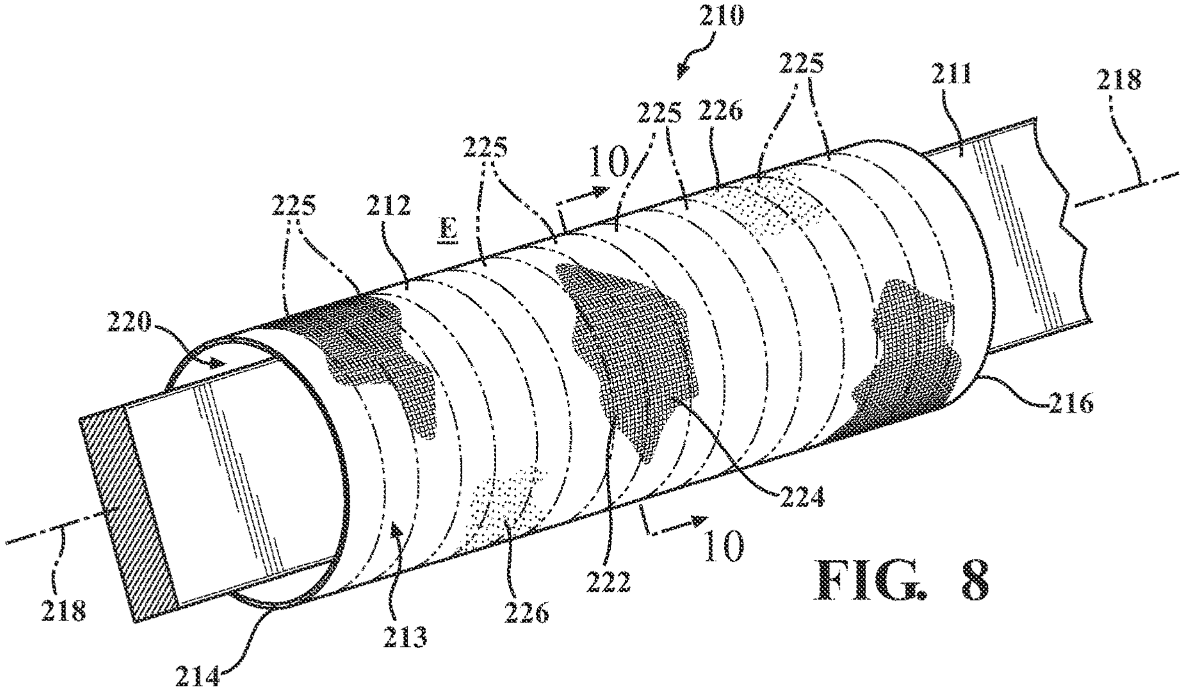
FIG. 8 is an enlarged, fragmentary schematic perspective view of a textile sleeve constructed in accordance with another aspect of the disclosure shown disposed about the elongate member to be protected with the textile sleeve shown in an as manufactured, non-shrunken state.
Figure 10:
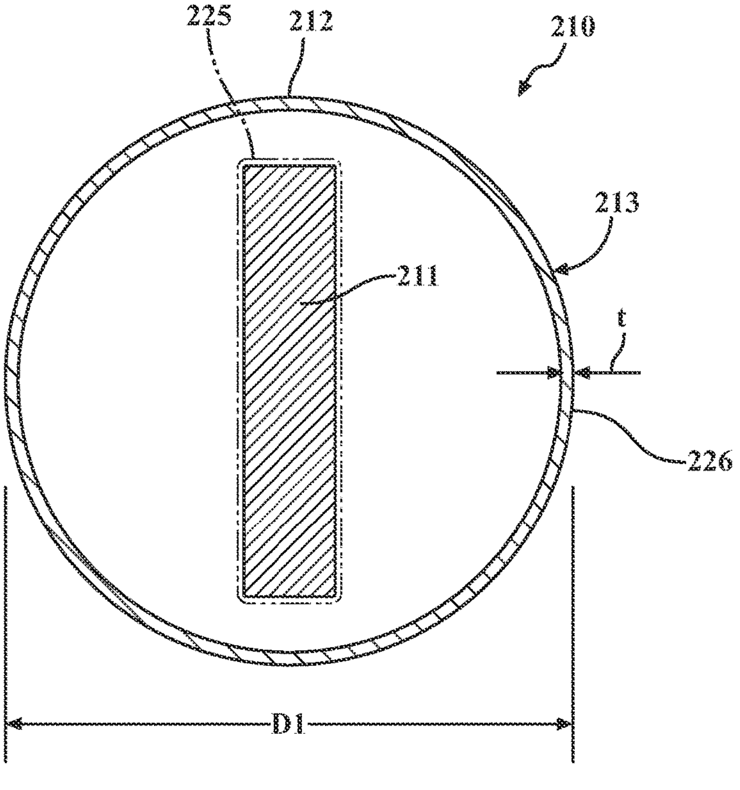
FIG. 10 is an enlarged schematic cross-sectional view taken generally along the line 10-10 of FIG. 8.
Figure 9:
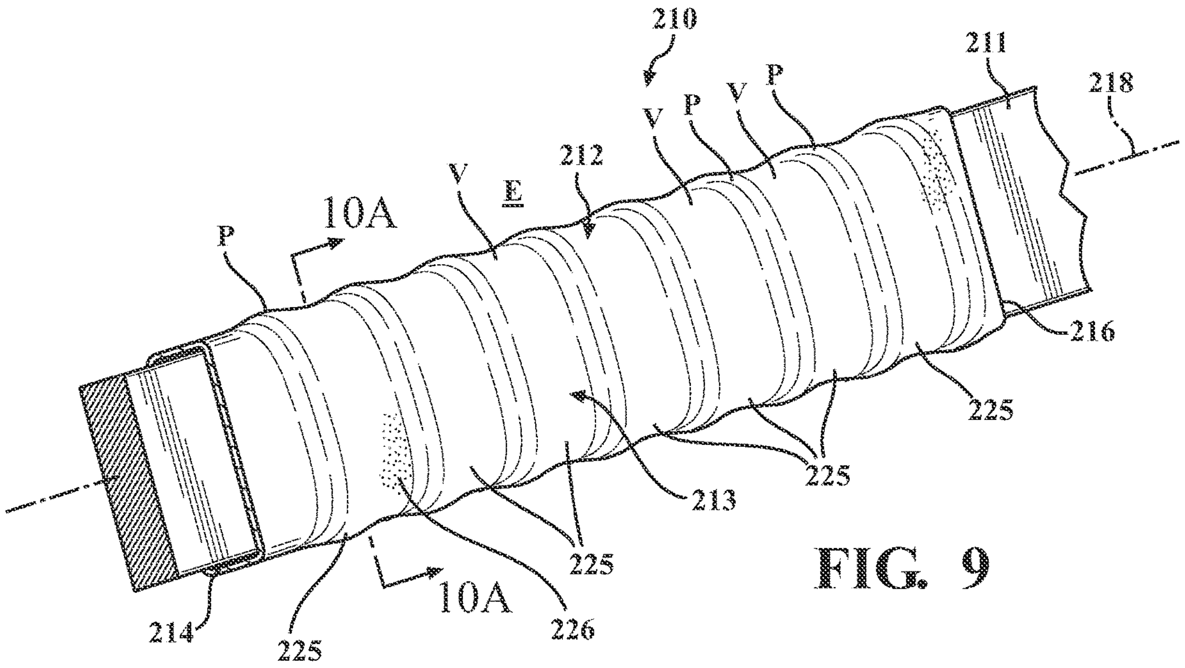
FIG. 9 is a view similar to FIG. 8 with the textile sleeve shown in a shrunken state.
Figure 10A:
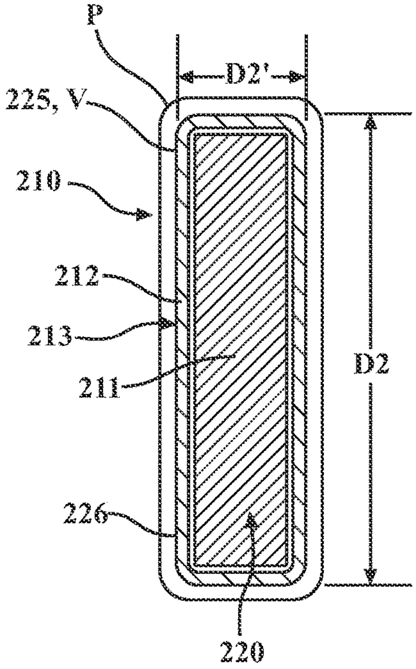
FIG. 10A is an enlarged schematic cross-sectional view taken generally along the line 10A-10A of FIG. 9.

FIG. 8 illustrates a textile sleeve, referred to hereafter as sleeve 210, constructed in accordance with another aspect of the invention having a textile wall 212 disposed about an elongate member 211 to be protected, such as a bus-bar interconnecting cells of an electric battery B of a vehicle, such as an electric vehicle EV, to one another. The textile wall 212 has a seamless, circumferentially continuous outer surface 213 that extends lengthwise between open opposite ends 214, 216 and about a longitudinal central axis 218 to bound a central cavity 220. The elongate member 211 extends through and is protected in the central cavity 220 against impact forces by the wall 212, such as may be experienced in a vehicle crash, abrasion, and ingress of contamination, by way of example and without limitation. The wall 12 suppresses flame propagation, such as in the event of thermal runaway of one or more of the cells of the battery(ies), thereby allowing the electric vehicle to remain powered by the batteries for 5 minutes or more to allow the electric vehicle to be safely driven to a parking location, whereat the operator can evacuate the electric vehicle. The textile wall 212 is formed of flame-resistant multifilament yarn 222 interlaced with shrinkable yarn 224, including monofilaments or multifilaments, wherein the shrinkable yarn 224 is configured to shrink and constrict circumferentially extending discrete regions 225 spaced axially from one another along the longitudinal axis 218, from a non-shrunken state (FIG. 10), to form the seamless, continuous outer surface 213 having a convolute contour formed by a plurality of peaks P and a plurality of valleys V alternating with one another, to a shrunken state (FIGS. 9 and 10A). The shrunken discrete regions 225 thereby bring the wall 213 into close fitting, conforming relation about the contour of the elongate member 211, thus, facilitating the suppression of flame, having a non-bulky low profile, and being aesthetically appealing. It is to be understood that the constriction of the sleeve 210 can be about any geometric shape, including circular and noncircular bus-bars 211, as viewed in lateral cross-section. As such, the shrinkage of the sleeve 210 can conform to non-circular contours, such shown by constricting across a major diameter D2 and a minor diameter D2' of the bus-bar 211 illustrated in FIGS. 9 and 10A. This is especially useful when constricting about irregularly shaped electrical connectors and the like, by way of example and without limitation. It is to be further understood that the convolute contour provided by the peaks P and valleys V enhance flexibility of the sleeve 210, thereby allowing the sleeve 210 to be routed over serpentine, meandering paths without kinking, while also enhancing the impact resistance via the peaks P.

Figure 11A:
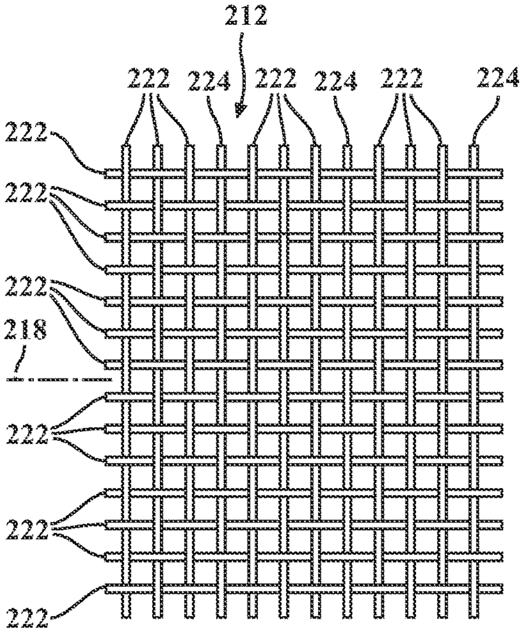
FIG. 11A is a schematic plan view of a textile layer of the sleeve illustrating the innermost textile layer being woven in accordance with one embodiment of the disclosure.
Figure 11B:
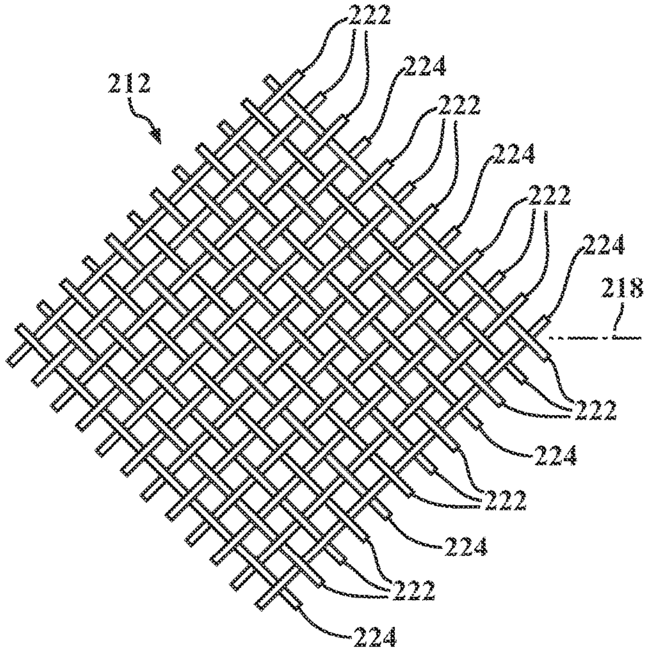
FIG. 11B is a view similar to FIG. 11A illustrating a textile layer being braided in accordance with another embodiment of the disclosure.
Figure 11C:
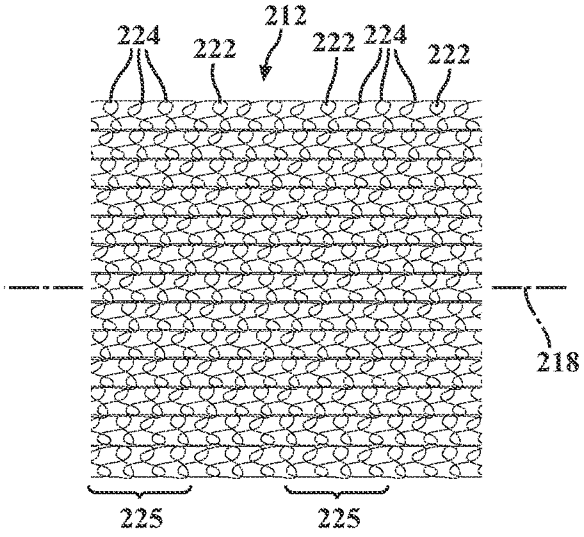
FIG. 11C is a view similar to FIG. 11A illustrating a textile layer being knitted in accordance with yet another embodiment of the disclosure.

The textile wall 212 is one of a woven wall (FIG. 11A), braided wall (FIG. 11B) or knit wall (FIG. 11C) constructed in circumferentially continuous, tubular fashion. It will be appreciated by one possessing ordinary skill in the art that a minimum amount of shrinkable yarn 224 can be used that is sufficient to form the desire number and width of valleys V along the wall 212. It is to be recognized that the individual widths of the valleys V can be provided as desired, wherein the widths can be the same or different from one another, as desired, by providing the discrete regions 225 with the same number of circumferentially extending shrinkable yarns 224 to provide the valleys V having the same widths relative to one another, or different numbers of circumferentially extending shrinkable yarns 224, as desired, to provide at least some of the discrete regions 225, and valleys V resulting therefrom, having varying, different widths relative to one another. Upon being exposed to an extreme heat scenario, such as during an unintended thermal runaway condition of one or more cells of the battery(ies), the shrinkable yarn 224 can be burned away or significantly burned by the excessive heat, while the flame-resistant multifilament yarn 222 retain their structural integrity to suppress flame growth and propagation for at least 5 minutes or more, thereby allowing ample time for an occupant of the motor vehicle EV to park and/or evacuate the motor vehicle EV.

An impervious, intumescent coating, also referred to as solid layer or layer 226, can be applied and bonded to the outer surface 213, such as a silicone, silicone-based, liquid silicone rubber, polytetrafluoroethylene, or polyurethane coating, also referred to as layer, bonded directly to the outer surface 213. The impervious layer 226 can be applied to the outer surface 213 using any desired process that allows the preferred thickness (t)(FIG. 10) of the layer 226 to be attained. In the exemplary embodiment, the thickness t is between about 0.05 and 3 mm, and more preferably between about 0.1 and 0.3 mm. When the layer 226 is provided within the aforementioned range of thickness t, flexibility and conformability of the wall 212 remains and optimal dielectric strength is provided, which can provide a dielectric breakdown voltage between about 5 to 40 kV. Accordingly, the elongate member 211 is protected against unwanted electrical interference, including electromagnetic interference (EMI), radiofrequency interference (RFI), and electrostatic discharge (ESD). In addition to the various electrical protections, greatly enhanced protection to the elongate member 211 against impact forces can be provided by the layer 226. Further yet, enhanced protection against the ingress of contamination is provided, such as fluid and debris, given the layer 226 can be hydrophobic and impervious to fluid and debris.

In accordance with another aspect, a method of constructing a sleeve 210 is provided. The method includes interlacing multifilament flame-resistant yarn 222 to form a textile wall 212 having a seamless, circumferentially continuous outer surface 213 extending along a longitudinal axis 218 between opposite open ends 214, 216 and, interlacing the multifilament flame-resistant yarn 222 with selectively located shrinkable yarn 224, wherein the shrinkable yarn 224 is configured to shrink and constrict circumferentially extending, annular discrete regions 225 of the textile wall 12, spaced axially from one another along the longitudinal axis 218, to form the continuous outer surface 213 with a convolute contour formed by a plurality of peaks P and a plurality of valleys V alternating with one another. The peaks P are formed predominately or entirely of the multi-filament flame-resistant yarn 222, while the valleys V are formed predominately or entirely of the shrinkable yarn 224 in the weft direction, with multifilament flame-resistant yarn 222 extending therethrough in the warp direction. Accordingly, the weft direction yarns forming the valleys V can be provided entirely of the shrinkable yarn 224.

In accordance with another aspect of the invention, the method can further include bonding an impervious coating 226 to the outer surface 213 of the textile wall 212.

In accordance with another aspect of the invention, the method can further include weaving the multifilament flame-resistant yarn 222 and the shrinkable yarn 224 to form the textile wall 212.

In accordance with another aspect of the invention, the method can further include braiding the multifilament flame-resistant yarn 222 and the shrinkable yarn 224 to form the textile wall 212.

In accordance with another aspect of the invention, the method can further include knitting the multifilament flame-resistant yarn 222 and the shrinkable yarn 224 to form the textile wall 212.

Obviously, many modifications and variations of the present invention are possible in light of the above teachings. It is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A sleeve for protecting an elongate member, comprising:

a knit wall having a circumferentially continuous outer surface extending along a longitudinal axis between opposite open ends, said knit wall being formed at least in part by multifilament flame-resistant yarn, wherein said multifilament flame-resistant yarn is knit to form first ribs extending lengthwise along said circumferentially continuous outer surface or second ribs extending annularly about said circumferentially continuous outer surface;

an impervious coating extending about said circumferentially continuous outer surface of said knit wall, wherein said impervious coating is one of a silicone, silicone-based, liquid silicone rubber, polytetrafluoroethylene, or polyurethane material bonded directly to said circumferentially continuous outer surface of said knit wall.

2. The sleeve of claim 1, wherein said plurality of first ribs and said second ribs are formed via alternating knit and purl stitches with one another in a desired pattern.

3. The sleeve of claim 1, wherein said multifilament flame-resistant yarn is a mineral yarn.

4. The sleeve of claim 3, wherein said mineral yarn is at least one of fiberglass, silica, and basalt.

5. The sleeve of claim 3, wherein said knit wall is formed entirely of said mineral yarn.

6. The sleeve of claim 1, wherein said knit wall is configured to be disposed about a bus-bar of a battery pack of an electric vehicle.

7. The sleeve of claim 1, wherein said impervious coating is silicone-based.

8. A sleeve for protecting a bus-bar connection between battery packs of an electric vehicle, consisting of:

a knit wall having a circumferentially continuous outer surface extending along a longitudinal axis between opposite open ends, said knit wall being formed at least in part by multifilament flame-resistant yarn, wherein said multifilament flame-resistant yarn is knit to form one of first ribs R extending lengthwise in generally parallel relation with said longitudinal axis or second ribs R extending circumferentially about said longitudinal axis; and an impervious coating extending about said outer surface of said knit wall, wherein said impervious coating is one of a silicone, silicone-based, liquid silicone rubber, polytetrafluoroethylene, or polyurethane layer bonded directly to said circumferentially continuous outer surface of said knit wall.

9. The sleeve of claim 8, wherein said plurality of first ribs and said second ribs are formed via alternating knit and purl stitches with one another in a desired pattern.

10. The sleeve of claim 8, wherein said multifilament flame-resistant yarn is a mineral yarn.

11. The sleeve of claim 10, wherein said mineral yarn is at least one of fiberglass, silica, and basalt.

12. The sleeve of claim 10, wherein said knit wall is formed entirely of said mineral yarn.

13. The sleeve of claim 8, wherein said impervious coating is silicone-based.

14. A method of constructing a sleeve for providing dielectric protection to a bus-bar interconnecting portions of an electric vehicle battery pack to one another, comprising:

knitting multifilament flame-resistant yarn to form a knit wall having a circumferentially continuous outer surface extending along a longitudinal axis between opposite open ends;

forming a plurality of first ribs extending lengthwise in generally parallel relation with the longitudinal axis in the knit wall or a plurality of second ribs extending circumferentially about the longitudinal axis in the knit wall;

bonding an impervious coating to the circumferentially continuous outer surface of the knit wall; and forming the impervious coating from one of a silicone, silicone-based, liquid silicone rubber, or polytetrafluoroethylene, or polyurethane material.

15. The method of claim 14, further including forming the first ribs and the second ribs by alternating knit and purl stitches with one another.

16. The method of claim 14, further including providing the multifilament flame-resistant yarn as a mineral yarn and knitting the entirety of the knit wall from the mineral yarn.

17. The method of claim 14, further including knitting the first ribs in substantially equidistantly spaced relation from one another or knitting the second ribs in substantially equidistantly spaced relation from one another.

18. The method of claim 14, further including forming the impervious coating being silicone-based.

* * * * *